United States Patent [19]

Bodnar

[11] Patent Number: 6,061,790
[45] Date of Patent: May 9, 2000

[54] NETWORK COMPUTER SYSTEM WITH REMOTE USER DATA ENCIPHER METHODOLOGY

[75] Inventor: Eric O. Bodnar, Capitola, Calif.

[73] Assignee: Starfish Software, Inc., Scotts Valley, Calif.

[21] Appl. No.: 08/805,990

[22] Filed: Feb. 24, 1997

Related U.S. Application Data

[60] Provisional application No. 60/031,327, Nov. 20, 1996.

[51] Int. Cl.[7] .................. H04L 9/08; H04L 9/32
[52] U.S. Cl. .............. 713/171; 380/282; 380/30
[58] Field of Search .................. 380/21, 30, 23, 380/44, 49, 32, 28

[56] References Cited

U.S. PATENT DOCUMENTS

| | | | |
|---|---|---|---|
| 4,200,770 | 4/1980 | Hellman et al. | 380/30 |
| 4,405,829 | 9/1983 | Rivest et al. | 380/30 |
| 4,649,233 | 3/1987 | Bass et al. | 380/21 |
| 4,956,863 | 9/1990 | Goss | 380/30 |
| 5,202,921 | 4/1993 | Herzberg et al. | 380/23 |
| 5,241,594 | 8/1993 | Kung | 380/4 |
| 5,535,276 | 7/1996 | Ganesan | 380/25 |
| 5,953,420 | 9/1999 | Matyas, Jr. et al. | 380/21 |

*Primary Examiner*—Pinchus M. Laufer
*Attorney, Agent, or Firm*—John A. Smart

[57] ABSTRACT

Computer-implemented methodology is described which allows any user to access a "network client" machine (e.g., PC, ATM machine, cell phone, or the like) which is connected to a network but which does not know the authentication of the user. With only the user's password, the client machine is able to initiate a communication session with a server and identify the user to the server as the person who the server truly expects. The method allows both the client and the server to each identify the other as authentic (not a middle man or imposter)—that is, without compromise in security along the communication link. In this manner, the user can access information from the true server in a secure manner and bring that information down to the local client, for instance, for use in a JAVA application.

40 Claims, 3 Drawing Sheets

NETWORK COMPUTER SYSTEM WITH REMOTE USER DATA ENCIPHER METHODOLOGY

The present application claims the benefit of priority from commonly-owned provisional application Ser. No. 60/031,327, filed Nov. 20, 1996, entitled PROPOSAL FOR REMOTE USER DATA ENCIPHER, listing inventor Eric O. Bodnar, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present application relates generally to use of a remote computing device with a host computer and, more particularly, methods for providing secured communications/transactions between a remote computing device with a host computer.

With each passing day, more and more computers are connected together through pervasive networks, such as corporate WAN (wide area network), the Internet, and the like. With the ever-increasing popularity of such environments, remote network computers are quickly becoming the workstation replacement of choice for corporations of the future. Network computers offer a range of benefits to the corporation including platform independence through JAVA, centralized maintenance from a server, no boundaries for storage, immunity to viruses, and immunity from mechanical device failure such as a bad hard disc. Network computers also present an interesting security problem since, without storage, all work-related information must be exchanged between the server and the client over a wire which must be thought of as insecure.

The first part of any network computer data transmission is establishing a secure line of communication for all transactions. A secure line means a number of things, including authentication of both parties and encryption of transfers such that anyone listening to the conversation in whole or in part can get nothing of value from it. Authenticating the client is an obvious requirement; it says that the user is really who he claims to be and is allowed to receive his personal data. Authenticating the server is less obvious but no less important; it says that the server is really the one the user expected to connect to and not an impostor volunteering to store sensitive data. Finally, enciphered transmissions are necessary so that anyone monitoring the transmission cannot obtain any sensitive data or useful information which will help to decipher sensitive data.

For a network client to be functional as a collaboration host, a secure transmission is not the only requirement. The user of the client must be able to send e-mail, schedules and other work-related requests which may contain sensitive data intended for specific eyes only. However, to do this, the user will need to transmit this data through totally insecure channels, such as unsecured e-mail servers (e.g., POP3 (Post Office Protocol) servers). To satisfy the requirements of the user, the network client must be able to encrypt messages with the appropriate public keys for the intended audience.

Sending encrypted messages entails decrypting the messages at some point. In order for a network client to be able to receive sensitive data which may have arrived via a totally insecure channel, it must be able to decrypt private messages with an appropriate private key. This means that a user's sensitive private key-ring file must be transmitted to the client machine safely and securely.

In order to serve the requirements for a secure transmission, enciphering data over open channels and deciphering data sent over open channels, a solution must overcome some problems inherent to the network computer model. The first problem is the assumedly storage-free network client. Here, the client does not remember anything when turned off, making it immune to viruses. Unfortunately, the client will not remember anything about the user either, including the user's private/public key-ring. Furthermore, a network client will not have a receptacle for portable media from which to load a user key-ring. Effectively, everything sensitive, including the user's private data, private keys, and list of certified public keys, are stored on the server and transmitted to the client.

Transmission of information can be compromised in a variety of ways. For instance, "visible transmission" poses one such problem to achieving secured communications. Because information must be somehow transmitted physically, such as over a wire (e.g., Internet) or wireless (e.g., cellular) network, the transmission is "visible"—that is, something which an unauthorized third party can tap into. A network computer can be connected directly over a LAN in an intranet setting, making transmissions visible to insiders, or it can be connected via the Internet, making transmissions visible to anyone. For instance, an unauthorized individual could monitor individual bits of data as that data stream's over a wire.

One approach to establishing a secure line between points A and B is to employ the Diffie-Hellman technique; see e.g., U.S. Pat. No. 4,200,770 (Apr. 29, 1980), entitled CRYPTOGRAPHIC APPARATUS AND METHOD, the disclosure of which is hereby incorporated by reference. Here, point A and point B each solve components of a logarithm independently, and, then, exchange the components over an open wire. Because each one, after a transaction, contains all of the components of a logarithm, each can solve it and, thereby, derive a private session key used for the exchange. A third party can of course monitor the components as they flow over the open wire. Nevertheless, the computational expense required for deriving the private session key from those components makes the approach highly impractical (especially as the larger numbers are employed in the process).

Although this approach can be used to establish a secure communication line between points A and B, the approach does not address the problem of a "man in the middle." Specifically, the methodology cannot be employed to guarantee that point B is really what point A expected it to be. For instance, given the desire of a client to establish a secure line with a server, the client might instead establish a secure line with a "man in the middle"—a server imposter. In such a scenario, the client establishes a private session key with the "man in the middle," who in turn maintains a totally separate session with the server (which thinks that it is the client). The "man in the middle" therefore establishes a secured transmission session with the real server, in essence making the "man in the middle" also a client imposter. Since, in this scenario, the "man in the middle" is situated in the communication pipeline between two secured transmission lines, it is able to monitor unsecured information. This problem is particularly acute for Internet-based communication. With the Internet, a client generally does not know how it is getting to its final data, at a target server. Often, the client must establish a communication link through a number of exchanges. With this common approach, communication is routed through a number of machines, any one of which can be set up to pose as a "man in the middle."

Further, simply guaranteeing that data can be passed securely between the client and the server does not guarantee that the data will not be viewed at the server side. Therefore, a viable solution should store information in an enciphered form at the server with no key to unlock it.

What is needed is a methodology allowing secure, authorized transactions to take place between a network computer client and a network server over an open wire. Such methodology would allow users to be able to establish a secure connection with a server from a network client, authorize themselves, verify the server and perform all client-related work including sending and receiving secure mail and modifying their public records. The approach needed is to "know" the ultimate target without knowing how (i.e., what routes) that ultimate target is reached. However the information is transmitted, such an approach should guarantee that those components which serve as routers have only the ability to transmit data intact; these components cannot modify or examine the data. The bits of data should be unintelligible or otherwise useless to unauthorized parties, including the server which serves as the storage site for the user's private data. The present invention fulfills this and other needs.

SUMMARY OF THE INVENTION

Using the methodology of the present invention, any user can access a "network client" machine (e.g., PC, ATM machine, cell phone, or the like) which is connected to a network but which does not know the authentication of the user. With only the user's password, the client machine is able to initiate a communication session with a server and identify the user to the server as the person who the server truly expects. The method allows both the client and the server to each identify the other as authentic (not a middle man or imposter)—that is, without compromise in security along the communication link. In this manner, the user can access information from the true server in a secure manner and bring that information down to the local client, for instance, for use in a JAVA application.

The client, which can be a "network client" (i.e., no knowledge of the user other than the password typed in by the user and (optionally) the user's finger print or key card), is able to establish using standard communication protocol (e.g., ASCII, HTML, or the like) not only a secure communication line with the server but, in addition, authenticate that the server is indeed who it claims to be. Further, the server, in a like manner, is able to establish a secure communication line with the client and authenticate that the client is who it claims to be. In this manner, the approach provides secured communication without the risk of a "man in the middle." Still further, since the server is not a trusted server, the server is already transmitting encrypted data, thereby decreasing the likelihood of unauthorized examination or modification of the data at the server. The client, in the process of authenticating itself, never actually transmits the password. Accordingly, the possibility that a third party (or someone at the server) could intercept the password and masquerade as the client at a future date is eliminated. Here, the password serves as a mechanism by which the client can finger print itself (including in combination with the finger print card, if desired); in no way, however, can the server easily derive a user's password from its finger print.

The data which can be transmitted in a secured fashion using the methodology of the present invention can comprise anything suitable for digital transmission, including the user's own public and private key ring storage information. Accordingly, the present invention enables use of electronic mail requiring public/private key encryption support at a remote terminal which knows nothing about the user (including the user's private key used for decrypting e-mail). Specifically, the methodology of the present invention allows the user to obtain and decrypt an encrypted copy of his or her private key at the remote location. Further, since the client is able to authenticate the server, the user can validate that the user is obtaining keys from an authenticated server.

DETAILED DESCRIPTION OF A PREFERRED EMBODIMENT

The following description will focus on the presently-preferred embodiment of the present invention, which is typically operative in end-user application programs and/or operating system programs running under the Microsoft® Windows environment. The present invention, however, is not limited to any particular one application or any particular environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms. including Macintosh, UNIX, NextStep, and the like. Therefore, the description of the exemplary embodiments which follows is for purposes of illustration and not limitation.

System Hardware

Figure 1:
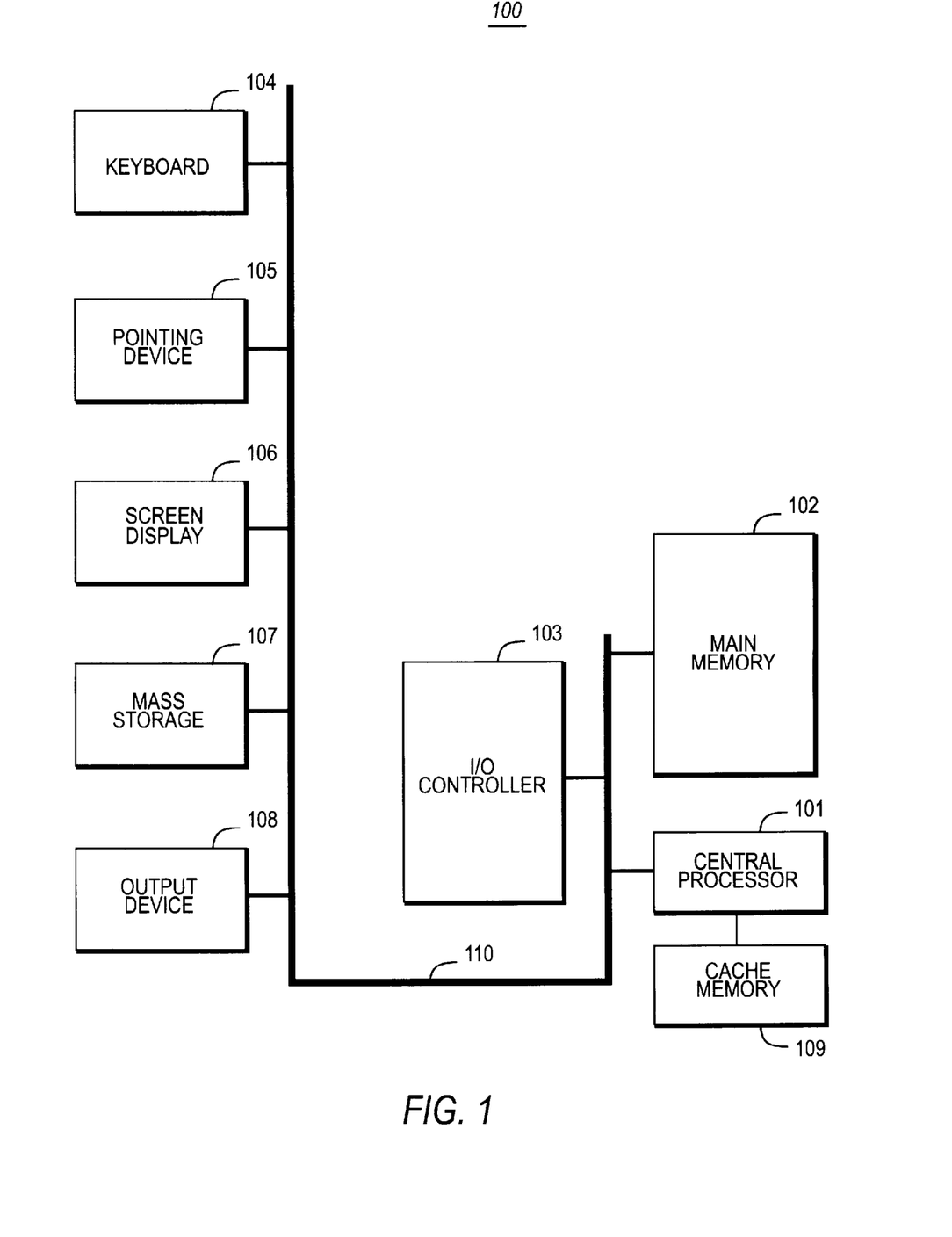
FIG. 1 is a block diagram illustrating a computer system in which the present invention may be embodied.

The invention may be embodied on a computer system such as the system 100 of FIG. 1, which comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.). I/O device 108 may include a laser printer, such as an HP Laserjet printer, which is available from Hewlett-Packard of Palo Alto, Calif.

System Software

A. Overview

Figure 2:
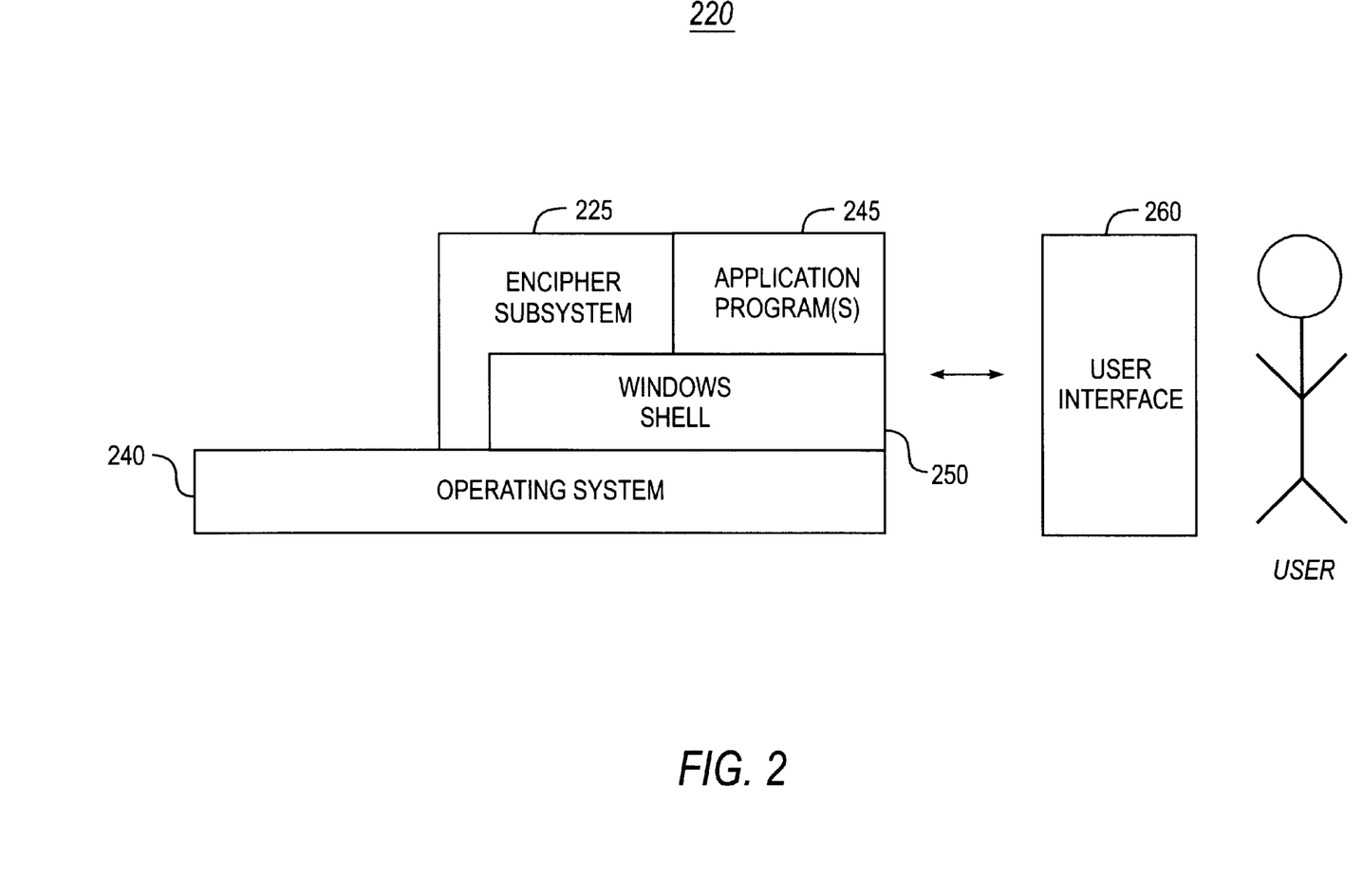
FIG. 2 is a block diagram of a computer software system for controlling the operation of the computer system of FIG. 1.

Illustrated in FIG. 2, a computer software system 220 is provided for directing the operation of the computer system 100. Software system 220, which is stored in system memory 102 and on storage (e.g., disk memory) 107, includes a kernel or operating system (OS) 240 and a windows shell 250. One or more application programs, such as client application software or "programs" 245 may be "loaded" (i.e., transferred from storage 107 into memory 102) for execution by the system 100.

System 220 includes a user interface (UI) 260, preferably a Graphical User Interface (GUI), for receiving user commands and data. These inputs, in turn, may be acted upon by the system 100 in accordance with instructions from operating system (OS) module 240, windows shell 250, and/or client application module(s) 245. The UI 260 also serves to display the results of operation from the OS 240, windows shell 250, and application(s) 245, whereupon the user may supply additional inputs or terminate the session. OS 240 and windows 250 can be provided by Microsoft® Windows 95, by Microsoft® Windows NT, or by Microsoft® Windows 3.x (operating in conjunction with MS-DOS), these are available from Microsoft Corporation of Redmond, Wash. Alternatively, OS 240 and windows 245 can be provided by IBM OS/2 (available from IBM of Armonk, N.Y.) or Macintosh OS (available from Apple Computers of Cupertino, Calif.). Although shown conceptually as a separate module, the UI is typically provided by interaction of the application modules with the windows shell, both operating under OS 240.

One application software comprises an encipher subsystem 225 which provides remote user data encipher methodology of the present invention. The subsystem secured communication between a host and a client, as will now be described in further detail.

Methodology for Remote User Data Encipher

A. Overview

At the outset, it is helpful to more thoroughly review the notion of a "network client" (NC). A network client is a "logical" client—one which is not necessarily tied to any particular physical (device) implementation. Instead, the use of the term network client captures the notion of a variety of devices which can be employed as clients on the network on the one hand, yet on the other hand clarifies each such device with a set of basic assumptions defining minimum functionality for each such device. The first assumption for a network client is that the client does not necessarily have any persistent storage (e.g., disk storage) on it. This does not mean, however, that the client is not a computer (e.g., personal computer), such as a Windows/Intel machine having a storage device (e.g., system 100). Instead, it means that the client is not required to have any such storage.

The implication of no storage for a client machine dictates that the machine cannot have any prior knowledge of who the actual user is at a given point in time of that machine. The client has no storage and thus knows nothing about the user prior to login. The client has no portable media mechanism by which it can load user information such as a key-ring. In other words, the machine does not store any distinguishing characteristics of the person who is the user at a given point in time. As a result, whoever the user is, including any identifying characteristics, need be stored elsewhere, accordingly, the information is communicated to the client through a connection of some nature.

A second assumption for a network client is, in a similar manner, that the machine has no receptacle for transient storage (e.g., floppy disk drive). Although such a storage is an option for a client, the assumption again is that such storage is not necessarily included. As a result, the user does not bring to the client anything which conveys information about the user.

In typical use, the client initiates the communication from any location. The client must therefore be able to initiate the communication, request a secure channel, send verification identity and verify the server's identity, all without prior knowledge of the user or the server. The client communicates with the server via a plain text protocol, potentially on an open channel such as TCP/IP via the Internet.

The client machine should be able to execute at least some (minimal) program logic or code. The code can be platform independent, such as JAVA, or native code; JAVA is document in the Sun JavaSoft JDK available at hitp://www.jcavasoft.com/products/JDK, the disclosure of which is hereby incorporated by reference. A Web browser client, for instance, can be provided with this capability by (1) downloading a JAVA applet, (2) downloading an ActiveX control (ActiveX SDK available at http://www.microsoft.com/msdownload/activex.htm; the disclosure of which is hereby incorporated by reference), or (3) modifying the browser to provide native support (e.g., via a plug-in module). Because the client machine has no storage, the application code which performs secure communication may be sent to the client machine insecurely. Therefore, embedding sensitive information, such as an important private key, in the client software is potentially insecure.

The server, for its part, is only a "partially trusted" server. Here, the server employed in the system of the present invention is not treated as trusted, but is at least trusted enough to store an encrypted copy of the data of the client. To improve system efficiency, however, the "strength" of the protection is typically not as great as would be employed were the server completely untrusted or when the data is transmitted over an open wire (e.g., Internet). The strength of the protection can be increased, as desired, to reflect a less-secured host server.

Two security levels are supported in an exemplary embodiment: password only or password/key-card. A user account is setup to use one of these two methods. Password-only security is "Level A" security; the only thing necessary to validate a user is the user name and password. The user's private password provides mental authentication, comprising the word(s) or phrase which the user has committed to memory. For any password scheme, passwords should be carefully chosen and should actually be mixed case and punctuation "pass phrases" rather than single words. The term password is a misnomer but is used for simplicity.

If the user wishes to use the new password for both log-in and disarming of data, all of the data armored with the old password must be sent to the client for disarming and then sent back to the server armed with the new password. To lessen this burden, one approach would be to change only the log-in password and require the user to enter the old password as old armored data comes up.

Since a password can be compromised, a user may (optionally) be required to possess some physical representation identifying the user. This represents "Level B" protection, a Password/Key-Card security scheme. The user name along with both a password and an electronic key-card are necessary to validate the user. The "key card" represents a logical description (not technical specification). The card is a physical item possessed by the user and it bears a "finger print." More particularly, the "finger print" represents the private key half of a public/private pair which uniquely identifies the card. Here, the corresponding public key is stored on the host server; the private key is only stored on the finger print card (and nowhere else). In this manner, the system can in fact authenticate that the user does indeed hold (i.e., have physical possession of) the finger print card.

This public/private key pair (of the finger print card) is used only for identification purposes. It is not used for data encryption of any sort. The reason for this is as follows. Should the user lose possession of the finger print card (private key), any data encrypted with the public key would be compromised. In a like manner, should the user lose the private key, any data encrypted with the public key is now inaccessible. Therefore, the finger print card is employed only for user identification, not data encryption. Level B presupposes that the network computer client has a receptacle for the key-card. Again, as in Level A, the password is really a "pass phrase" and should be carefully chosen.

The description which follows focuses on methodology of the present invention by which a storage-less client can establish secure communication with an authorized server without exchanging or storing any vulnerable user data. For enciphering, the method employs well-known and often-used techniques for public key enciphering. In an exemplary embodiment, for instance, the method of the present invention incorporates logarithmic properties which are the foundation of the Diffie-Hellman key exchange.

B. Exemplary session

Figure 3:
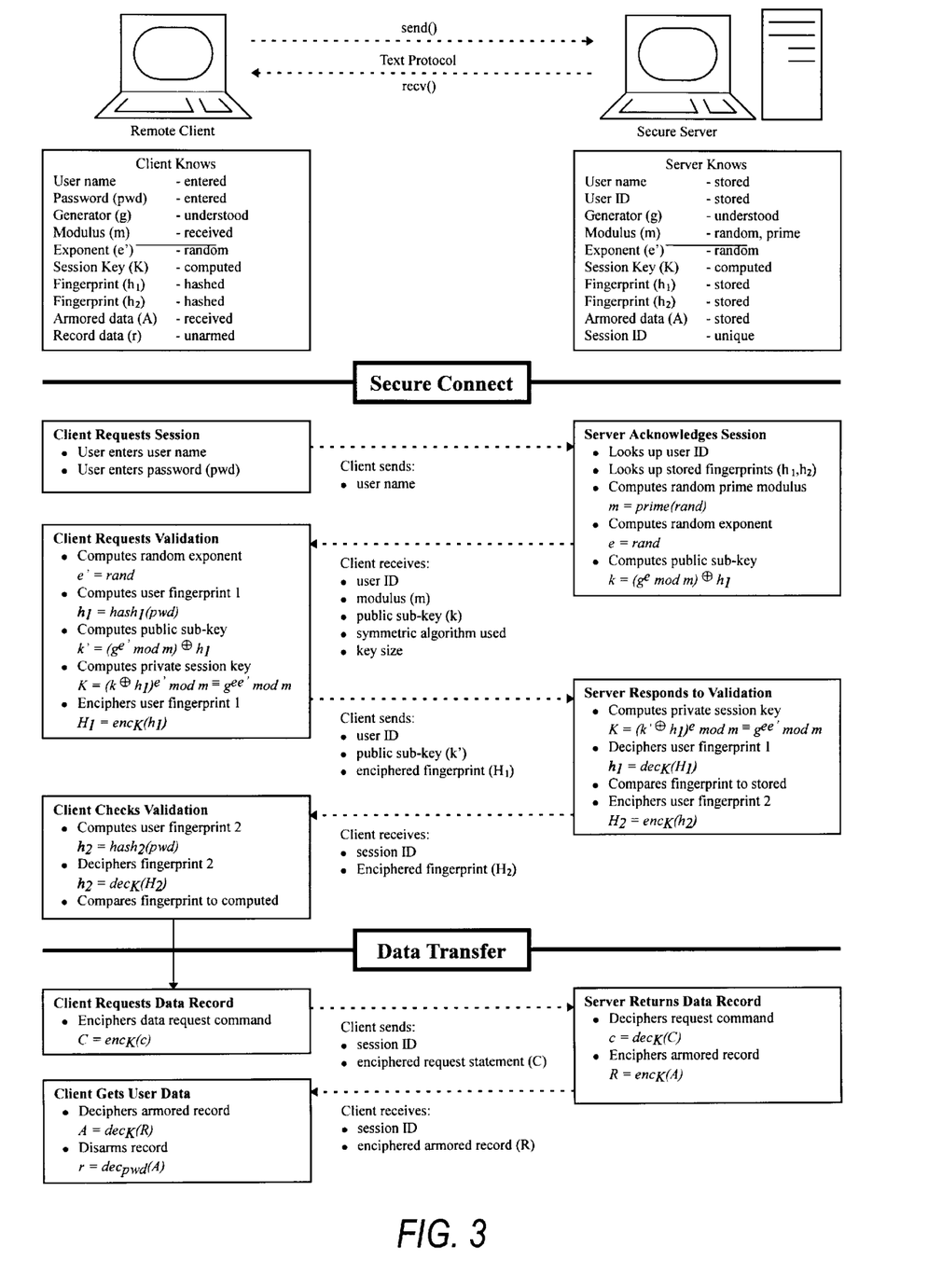
FIG. 3 is a block diagram illustrating overall methodology of the present invention for establishing secured communication between a client and a server, each of which authenticates the other.

The following is an exemplary walk-through of the steps necessary to establish communication and then exchange data. FIG. 3 illustrates this process diagrammatically.

1. Client Requests Session

At the outset, the client requests a secure session with a server. In an exemplary session, the client initiates the communication process upon a user logging into a client terminal. A typical scenario would include, for instance, a user walking up to a JAVA-enabled terminal (i.e., "network client") in an airport, typing in his or her name and password (and optionally inserting a key or finger print card into the terminal). This initiation sequence starts the communication process.

It is assumed that anyone can be listening and that there may be a man in the middle trying to gain useful information as it is passed through. The client software itself is assumed to have been sent to the client machine as well, perhaps as a JAVA application. In this first step, the client software asks the user to log in by entering a user name and a password. The client then sends a request for a secure session to the server accompanied by only the user name.

2. Server Acknowledges Session

The server receives the client's initial request and looks up the user name in the user database. Along with the user name are the unique user ID and two stored fingerprints, $h_1$ and $h_2$, which the server retrieves. Both the server software and the client software have embedded within an understood number g which is the generator used to begin a public key calculation process.

The server now proceeds to compute a random large prime number called the prime modulus m. Since the prime modulus may take significant computing power to produce, the server should generally assume this task. Nevertheless, a Pentium-class computer can easily compute a 512-bit modulus in under 30 seconds with a 98% probability that it is prime.

Next, the server computes a random exponent e and then calculates the server's component of the public key. The public key component is simply a Diffie-Hellman style calculation XORed ($\oplus$) with the first stored fingerprint.

$$k = (g^e \bmod m) \oplus h_1$$

Finally at this point, the server sends to the client a user ID number, the modulus m, its component k of the public key, the type of symmetric encryption algorithm it uses, and the size of the key. The server could also send the generator g, as would be the case for standard Diffie-Hellman, but g is left unspoken and embedded in the software as an additional annoyance to anyone listening to the line.

3. Client Requests Validation

Now that the server has answered the client's initial request, the client can begin the process of securing the transmission. The client starts by computing its own random exponent e' for use in computing its component k' of the public key. The client also performs a one-way hash on the user's password to arrive at the value $h_1$. A one-way hash function is a function which is "easy" to go one way but "difficult" to reverse. This is perhaps best explained by way of example.

Consider, for instance, the common C standard library function, strlen (string length). This function serves to take an input string and return a length for the string (i.e., how many characters comprise the string). Suppose use of the strlen function returned a value of 10. If one only has the output value of 10, it is a difficult task to determine the exact input string which gave rise to that value (as there are many strings which can give rise to a strlen value of 10). Although the strlen function aptly illustrates the basic notion of a one-way hash function, strlen is not particularly useful for encryption purposes since there is a relatively high degree of collision (i.e., dissimilar inputs yielding the very same output value). Accordingly, encryption-specific one-way hash functions, ones which include low collision (e.g., MD4 or MD5), are generally employed. See e.g., Rivest, Network Working Group RFC 1320, The MD4 Message-Digest Algorithm, MIT Laboratory for Computer Science and RSA Data Security, April 1992; and R. Rivest, The MD4 Message Digest Algorithm, Advances in Cryptology, Proc. of Crypto 90. Lecture Notes in Computer Science 537, Sprigner Verlag 1991, pp. 303–311. The disclosures of each of the foregoing are hereby incorporated by reference.

The purpose of the one-way hash function is to enable the client to transmit a one-way hash result of the client's password, without transmitting the password itself. The computed value $h_1$ can now be applied to the public key component.

$$k' = (g^{e'} \bmod m) \oplus h_1$$

The client also has all of the data necessary to compute the private session key K which will be used to encipher all transmitted data.

$$K = (k \oplus h_1)^{e'} \bmod m \equiv g^{ee'} \bmod m$$

The client proceeds to encipher the first fingerprint with the private session key and then sends the user ID, its component k' of the public sub-key, and the enciphered fingerprint $H_1$.

4. Server Responds to Validation

At this point, the server is now able to generate the private session key which it uses to decipher the fingerprint passed by the client.

$$K=(k'\oplus h_1)^e \bmod m \oplus g^{ee'} \bmod m$$

$$h_1 = \text{dec}_K(H_1)$$

The fingerprints for the user are previously stored on the server when a new account is opened; this can be done in a conventional manner. If the user is valid, the deciphered fingerprint should match the stored copy on the server. Furthermore, both the client and the server must have prior knowledge of the fingerprint, whether calculated or stored, in order to generate the correct private session key K. A man in the middle could not impersonate the client without this fingerprint.

The server, once satisfied with the client, sends back a unique session ID (valid for the term of the session) and a copy of the second fingerprint $H_2$ enciphered with the private session key.

5. Client Checks Validation

With the server satisfied, the client has only to verify the server's identity. This is done by computing a second finger print $h_2$ from another one-way hash on the user's password, deciphering the value $H_2$ passed back by the server and comparing the two. Only the server could have known $h_2$ and enciphered it properly.

Assuming a man in the middle existed, he would have been denied by the server in the previous transaction but might still attempt to fool the client. Unfortunately for him, he does not have the second fingerprint either; accordingly, the client would simply drop the line.

6. Client Requests Data

Having established a secure connection with a public key exchange, having thwarted any man in the middle attacks, and having established identity of both the server and the client, the client is now ready proceed with user data requests. To do this, the client enciphers a text command message for the server with the private session key and sends the session ID and the enciphered request. The server then deciphers the request command, looks up the armored user data record and then sends the enciphered record back to the client along with the session ID.

The user data records stored on the server are "armored." This term, for the purpose of this discussion, is equivalent to "symmetrically enciphered" except that the key is the user's password not the session key. Because the server is simply a repository for the user's armored data and because the server has no record of the user's password, the server cannot get at the users data. Only the client can disarm the user data with the user's password. Anyone listening to the transmission between the client and the server will only see the session ID) and a block of enciphered data. The observer cannot even get the context of the conversation. The client and the server could be exchanging information about the observer for all the observer knows.

7. Client Delivers Data

Delivery from the client is similar to retrieval. The client simply sends to the server an enciphered command combined with the enciphered, armored data block, and a session ID. The server will decipher the command and store the armored record.

C. Key-Card option

The key-card option, which is used by Level B security, changes the model slightly. The private key p which is embedded in the key-card is used to perform a second enciphering pass on the first user fingerprint passed to the server by the client.

Level A: $H_1 = \text{enc}_K(h_1)$

Level B: $H_1 = \text{enc}_p(\text{enc}K(h_1))$

The server has a copy of the key-cards related public key p' which is not sensitive and which it uses to decipher the fingerprint.

A finger print or key card does not allow the user to store any particular information about himself or herself, instead it serves (by the very nature of its physical possession by the user) as a means for further authenticating the individual to be the user who he or she claims to be. Because the private key on the key-card is only used in this manner to sign the fingerprint and never used for enciphering actual user data, loss or destruction of the key-card does not lead to loss or destruction of the user's data. The server administrator simply issues another key-card with a different private/public key pair and records the public key in the server. The user is inconvenienced only for the duration of time it takes to issue a new card.

D. Application to e-mail systems

One of the most difficult parts of any secure electronic mail systems is the management of private and public key rings. Consider, for instance, conventional two-key encryption methodology. Here, a user who wants to read his or her e-mail remotely (e.g., download from a mail server while on the road) must possess a copy of that user's private key, such as retained on a floppy disk or on a storage device of a laptop computer. Public keys may come from untrusted sources and private keys are often placed in vulnerable spots such as on a floppy disk. Portable media, such as floppy disks, can become damaged which would mean loss of all enciphered data. The conventional approach is cumbersome, at best.

The methodology of the present can be employed to simplify remote access of a user's e-mail. A server, constructed in accordance with the present invention, can provide a safe repository for a user's sensitive private electronic mail key-ring and can act as a certified agent to deliver the public keys of other members. This eliminates the reliance on notions such as the "web of trust," eliminates the annoyance of key signing, eliminates the risk of leaving a key-ring lying around on portable media, and eliminates the loss of data resulting from damage to such portable media. More importantly, the client machine does not need a receptacle for portable media, the user need not carry a key-ring around.

Because the server can sponsor directories of public keys for each of its members, the server eliminates the need for a public key-ring in the first place. The user's public key-ring is the public key-ring of the server which is always secure and up to date. The server operates as a certified authority for public keys. If two servers can establish a secure channel between them, a secondary server could make available to a primary server, and ultimately to the user, all public data in a certifiable fashion. This is very useful for extending key-ring lookup to multiple servers, for instance.

E. Additional considerations

1. Client Computations

In accordance with the present invention, the client has only a few simple computations to make. Preferably, the client should have a reasonably good random number generator for its private exponent used to compute the session key. If these exponents can be predicted easily, security is reduced. All other computations, hashing, computing the session key and enciphering data are lightweight.

2. Server Computations

The server performs the hardest step in the computation process—the computation of the random prime modulus. Depending on the implementation and the required size of the modulus, this can be a significant computation. All other computations are lightweight, however.

3. Bulk Encryption Mechanism

The actual bulk enciphering mechanism employed can be any symmetric algorithm. Blowfish and IDEA are two particularly well suited algorithms for the system, but others such as DES can be used. See e.g., Bruce Schneier, *The Blowfish Encryption Algorithm*, Dr. Dobb's Journal, April 1994, pp. 38–40; Bruce Schneier, *The IDEA Encryption Algorithm*, Dr. Dobb's Journal, December 1993; and *Data Encryption Standard* (DES), as published by the National Bureau of Standards, Department of Commerce, FIPS, pub 46, January 1977, pp. 653–670. The disclosures of each of the foregoing are hereby incorporated by reference. The strength of the algorithm determines the strength of the transmission and the armoring of user data. Alternatively, different methods may be employed for armoring user data and for enciphering the transmission. The size of the session key used for symmetric enciphering depends on the chosen symmetric algorithm and not on the proposed method; any key size works.

F. Withstanding attacks

1. Wire Attack

A wire attack is easily foiled. All data, even the context of the data, is heavily protected. The user data has an additional armor shell around it making code-breaking all the more difficult. A man in the middle will be denied connection by both the server and the client and is thus instantly demoted to a third party observer at best. Further increasing difficulty, the public key components which are used to build the private key are combined with an unknown piece of data, the fingerprint, leaving any attacker trying to solve the discrete logarithm (an already near-impossible process), with no elements to even start with except the modulus and possibly the generator.

2. Server Side Attack

It is possible for an attacker to threaten the service provider and gain access to a user's armored data records on the server by force. However, the records are still armored (with a well-chosen password) thus requiring the attacker to code-break the data. The attacker would need to apply massive computing power to the problem before attaining even the hope of decrypting the user's data.

3. Client Side Attack

A forceful client side attack is a possibility. In this situation, the attacker obtains the user password and key-card by force or because the user carelessly left them in plain sight. If the risk of this type of attack is significant, the key-card could accommodate a self-destruct feature for users forced into this situation.

4. Other Attacks

An attacker might simply try to guess the user's password or try a dictionary attack on the user's password. Such an approach is easily foiled since the server can lock out any access for a set period of time, say an hour, after three or so failed password attempts. Realistically, such an approach only works in the scenario where the attacker has threatened the service provider with force in order to gain access to the server.

G. Advantages

A particular advantage of the methodology of the present invention is that the user's password is never transmitted or stored. The user's password, which is the key to all armored user data, is never transmitted over the connection and is never stored on the server. The server, thus, acts as a repository for data but is unable to examine the data, since that data resides on the server in encrypted form. The data, therefore, can contain sensitive information such as private key-rings for use in electronic mail exchanges.

The key-card option is only used for signing the user's password fingerprint and thus serves only as an additional form of identification. It does not store any important information about the user. Loss of the key-card is merely an inconvenience and does not translate to a loss of data. Should the card be lost, the only impact is that the user could temporarily not claim to be an authenticated user, since the user temporarily does not have a functioning card. Importantly, however, the user does not lose any information or reveal any other details about that user.

Using the methodology of the present invention, any user can access a "network client" machine (e.g., PC, ATM machine, cell phone, or the like) which is connected but which does not know the authentication of the user. With only the user's password, the client machine is able to initiate a communication session with a server and identify the user to the server as the person who the server truly expects. The method allows both the client and the server to each identify the other as authentic (not a middle man or imposter)—that is, without compromise in security along the communication link. In this manner, the user can access information from the true server in a secure manner and bring that information down to the local client, for instance, for use in a JAVA application.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system having computing devices comprising at least a client connected to a server through a communication network, a method for establishing a secured communication session between the client and the server for enciphering data, the method comprising:

receiving input at the client comprising user information, said input being received a point in time when it is desired to establish said secured communication session, said user information including a user identifier which uniquely identifies a particular user to the system and including a user password;

transmitting a request from the client to the server for establishing a secured communication session between the client and the server, said request including said user identifier;

retrieving at the server, based on said user identifier transmitted to the server, previously-stored user authentication information for authenticating the particular user;

computing at the server a first public sub-key, said first public sub-key being based at least in part on said previously-stored user authentication information;

transmitting said first public sub-key to said client;

computing at the client a second public sub-key, said second public sub-key being based at least in part on said user password and said computed first public sub-key;

computing at the client a secret session key, based at least in part on said computed second public sub-key; and enciphering data with said computed secret session key.

2. The method of claim 1, wherein said user identifier comprises a user name.

3. The method of claim 1, wherein said computing at the server a first public sub-key includes computing a prime modulus.

4. The method of claim 1, wherein said computing at the server a first public sub-key includes computing a random exponent.

5. The method of claim 1, wherein said computing at the server a first public sub-key includes computing a server component k by:

$$k=(g^e \bmod m) \oplus h_1$$

where m represents a prime modulus, e represents a random exponent, g represents a generator value, and $h_1$ represents said user authentication information.

6. The method of claim 1, wherein said computing at the client a second public sub-key includes computing a random exponent.

7. The method of claim 1, wherein said computing at the server a first public sub-key includes computing a prime modulus and wherein said computing at the client a second public sub-key includes computing said second public sub-key based at least in part on said prime modulus.

8. The method of claim 1, wherein said computing at the client a second public sub-key includes:

computing a hash value based at least in part on said user password; and computing said second public sub-key based at least in part on said hash value.

9. The method of claim 1, wherein said computing at the client a second public sub-key includes computing a client component k' by:

$$k'=(g^{e'} \bmod m) \oplus h_1$$

where m represents a computed prime modulus, e' represents a computed random exponent, g represents a generator value, and $h_1$ represents a computed hash value based at least in part on said user password.

10. The method of claim 9, wherein said prime modulus is transmitted from the server to the client prior to the client's determination of said client public sub-key.

11. The method of claim 9, wherein said generator value is previously stored at both the client and the server.

12. The method of claim 9, wherein said generator value is exchanged between the client and the server.

13. The method of claim 1, wherein said computing at the client a secret session key includes computing a secret session key K by:

$$K=(k \oplus h_1)^{e'} \bmod m$$

where k represents said second public sub-key, $h_1$ represents a computed hash value based at least in part on said user password, e' represents a computed random exponent, and m represents a computed prime modulus.

14. The method of claim 1, wherein said secret session key comprises a secret session key which is only valid during the current session.

15. The method of claim 1, further comprising:

computing a hash value based at least in part on said user password, transmitting the hash value from the client to the server; and at the server, authenticating the client by comparing the hash value transmitted from the client with the previously-stored user authentication information.

16. The method of claim 15, wherein said transmitting the hash value from the client to the server step includes:

enciphering the hash value before transmitting it from the client to the server.

17. The method of claim 15, further comprising:

after authenticating the client, transmitting a session identifier from the server to the client, said session identifier being valid only during the current session.

18. The method of claim 17, wherein said transmitting a session identifier step includes:

enciphering said session identifier before transmitting it from the server to the client.

19. The method of claim 1, further comprising:

transmitting said second public sub-key from the client to the server; and computing at the server said secret session key, based at least in part on said transmitted second public sub-key.

20. The method of claim 1, further comprising:

computing a hash value based at least in part on said user password and which corresponds to second user authentication information stored at the server, said second user authentication information for authenticating the particular user;

transmitting said second user authentication information from the server to the client; and at the client, authenticating the server by comparing the second user authentication information transmitted from the server with the computed hash value.

21. The method of claim 20, wherein said transmitting said second user authentication information from the server to the client step includes:

enciphering said second user authentication information before transmitting it from the server to the client.

22. The method of claim 1, further comprising:

computing at the server said secret session key, based at least in part on said computed second public sub-key; and enciphering data at the server with said computed secret session key and thereafter transmitting the enciphered data to the client.

23. The method of claim 22, wherein data of the particular user which is stored at the server is previously enciphered using said user password, such that any data of the particular user is twice enciphered before being transmitted from the server to the client.

24. The method of claim 23, further comprising:

deciphering enciphered data of the particular user upon transmission from the server to the client by deciphering the transmitted data first with said secret session key and thereafter deciphering the once-deciphered transmitted data with said user password.

25. The method of claim 1, further comprising:
receiving input at the client further comprising information from a user key-card for authenticating the particular user.

26. The method of claim 25, wherein said user key-card stores a private key of a private key/public key pair, said public key being stored at the server.

27. The method of claim 26, further comprising:
computing a hash value based at least in part on said user password;
enciphering said hash value with said private key stored by said key-card;
transmitting the enciphered hash value from the client to the server; and
authenticating the client to the server by:
deciphering the enciphered hash value at the server, and comparing the deciphered hash value from the client with the previously-stored user authentication information.

28. The method of claim 26, wherein said key-card is employed for authenticating users without using it for enciphering or deciphering any user data stored at the server.

29. The method of claim 1, further comprising:
computing at the server said secret session key, based at least in part on said computed second public sub-key;
retrieving an e-mail private key for the particular user stored at the server; and
transmitting to the client an enciphered copy of said e-mail private key for the particular user.

30. The method of claim 29, further comprising:
transmitting an enciphered copy of an e-mail public key ring for the particular user.

31. A secured client/server system comprising:
a client connected to a server through a communication network;
an input means at the client for receiving user information at a point in time when it is desired to establish a secured communication session between said client and said server, said user information including a user identifier which uniquely identifies a particular user to the system and including a user password;
means for computing at the server and at the client respective public sub-keys, based at least in part on a hash value derived from said user password;
means for exchanging said respective public sub-keys;
means for computing at the server and at the client a shared secret session key that is generated at least in part from said respective public sub-keys; and
means for enciphering and deciphering data with said secret session key.

32. The system of claim 31, wherein said means for computing at the server and at the client respective public sub-keys includes:
means for transmitting a request from the client to the server for establishing a secured communication session between the client and the server, said request including said user identifier;
means for retrieving at the server, based on said user identifier transmitted to the server, previously-stored user authentication information for authenticating the particular user;
means for computing at the server a first public sub-key, based at least in part on said previously-stored user authentication information;
means for transmitting said first public sub-key to said client;
means for computing at the client a second public sub-key, based at least in part on said user password and said computed first public sub-key;
means for transmitting said second public sub-key from the client to the server; and
means for computing at the client a secret session key, based at least in part on said computed second public sub-key; and
means for computing at the server said secret session key, based at least in part on said computed second public sub-key.

33. The system of claim 31, further comprising:
means for authenticating the client to the server.

34. The system of claim 31, further comprising:
means for authenticating the server to the client.

35. The system of claim 31, wherein said means for enciphering and deciphering data employs a selected one of IDEA, Blowfish, and DES block cipher.

36. The system of claim 31, wherein said previously-stored user authentication information comprises a one-way hash of said user password.

37. The system of claim 36, wherein said one-way hash employs a selected one of an MD4 one-way hash and an MD5 one-way hash.

38. The system of claim 31, wherein said password includes a pass phrase comprising one or more words.

39. The system of claim 31, further comprising:
second input means at the client for receiving a user key-card for authenticating a particular user to the system.

40. The system of claim 39, wherein said user key-card stores a private key of a separate private key/public key pair, with the public key of said separate private key/public key pair being stored at the server.

* * * * *